US012804712B2

(12) United States Patent
Lim et al.

(10) Patent No.: US 12,804,712 B2
(45) **Date of Patent: *Nov. 17, 2026**

(54) WIRELESS LAN SENSING PROCEDURE

(71) Applicant: LG ELECTRONICS INC., Seoul (KR)

(72) Inventors: Dongguk Lim, Seoul (KR); Jeongki Kim, Seoul (KR); Jinsoo Choi, Seoul (KR); Insun Jang, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 637 days.

This patent is subject to a terminal disclaimer.

(21) Appl. No.: 18/269,462

(22) PCT Filed: Dec. 22, 2021

(86) PCT No.: PCT/KR2021/019596

§ 371 (c)(1),
(2) Date: Jun. 23, 2023

(87) PCT Pub. No.: WO2022/139449

PCT Pub. Date: Jun. 30, 2022

(65) Prior Publication Data

US 2024/0064804 A1 Feb. 22, 2024

Related U.S. Application Data

(60) Provisional application No. 63/129,604, filed on Dec. 23, 2020.

(51) Int. Cl.
*H04W 74/0808* (2024.01)
*H04W 84/12* (2009.01)

(52) U.S. Cl.
CPC ........ *H04W 74/0808* (2013.01); *H04W 84/12* (2013.01)

(58) Field of Classification Search
CPC .......................... H04W 74/0808; H04W 84/12
See application file for complete search history.

(56) References Cited

U.S. PATENT DOCUMENTS 10,038,535 B2 7/2018 Chun et al.
2007/0189168 A1 * 8/2007 Yao ......................... H04L 63/20 370/231

(Continued)

FOREIGN PATENT DOCUMENTS

JP 2014207634 10/2014
KR 1020100130535 12/2010

(Continued)

OTHER PUBLICATIONS

Chen, "Overview of WLAN Sensing Protocol", IEEE 802.11-20/1232r0, Aug. 16, 2020 (Year: 2020).*

(Continued)

*Primary Examiner* — Siren Wei
(74) *Attorney, Agent, or Firm* — LEE, HONG, DEGERMAN, KANG & WAIMEY

(57) ABSTRACT

The present specification proposes a new procedure of signal transmission or reception between STAs in a case of sensing measurement initiated by an STA rather than an AP. According to an embodiment of the present specification, proposed is a sensing measurement procedure performed by an AP in response to transmission of a sensing initiation frame to the AP by an STA rather than the AP. According to another embodiment of the present specification, according to an embodiment of the present specification, proposed is a procedure in which an STA rather than an AP transmits a sensing initiation frame to the AP, and then the AP requests respondent STAs to transmit NDP frames. According to yet (Continued)

another embodiment of the present specification, proposed is a method for configuring a frame transmitted or received in the above procedures.

6 Claims, 16 Drawing Sheets

(56) References Cited

U.S. PATENT DOCUMENTS

| | | | | |
|---|---|---|---|---|
| 2015/0139212 | A1 | 5/2015 | Wang et al. | |
| 2020/0359248 | A1* | 11/2020 | Sadeghi | H04W 74/0808 |
| 2021/0288779 | A1* | 9/2021 | Da Silva | H04L 5/0007 |

FOREIGN PATENT DOCUMENTS

| | | |
|---|---|---|
| KR | 1020150035721 | 4/2015 |
| KR | 1020160060579 | 5/2016 |
| KR | 1020160143681 | 12/2016 |
| KR | 102004104 | 7/2019 |

OTHER PUBLICATIONS

PCT International Application No. PCT/KR2021/019596, International Search Report dated Mar. 29, 2022, 4 pages.

Japan Patent Office Application No. 2023-538028, Office Action dated Aug. 12, 2025, 3 pages.

Jang et al., "Discussion on WLAN Sensing Roles," IEEE 802.11-20/1805r1, Nov. 2020, 11 pages.

Lim et al., "Sensing Measurement sequence of 11bf," IEEE 802.11-21/0419r0, Mar. 2021, 18 pages.

European Patent Office Application Serial No. 21911516.9, Search Report dated Oct. 28, 2024, 11 pages.

Silva et al., "A Channel Measurement Procedure for WLAN Sensing," IEEE 802.11-20/0842r0, Jun. 2020, 14 pages.

United States Patent and Trademark Office U.S. Appl. No. 18/377,691, Office Action dated Feb. 8, 2024, 11 pages.

Chen et al., "Overview of WLAN sensing protocol," IEEE 802.11-20/1232r0, Aug. 2020, 11 pages.

Korean Intellectual Property Office Application No. 10-2023-7020142, Office Action dated Aug. 3, 2026, 7 pages.

* cited by examiner

WIRELESS LAN SENSING PROCEDURE

CROSS-REFERENCE TO RELATED APPLICATION(S)

This application is the National Stage filing under 35 U.S.C. 371 of International Application No. PCT/KR2021/019596, filed on Dec. 22, 2021, which claims the benefit of U.S. Provisional Application No. 63/129,604, filed on Dec. 23, 2020, the contents of which are all incorporated by reference herein in their entirety.

TECHNICAL FIELD

The present disclosure relates to a wireless LAN system, and more particularly to wireless LAN sensing.

BACKGROUND

A wireless local area network (WLAN) has been improved in various ways. For example, IEEE 802.11bf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.11bf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies.

For example, the WLAN sensing proposed herein may be used to sense the movement or gesture of an object. Specifically, the WLAN STA may sense the movement or gesture of an object based on measurement results of various types of frames/packets designed for WLAN sensing.

If sensing measurements initiated by non-APs are performed, a definition of peer-to-peer (P2P) based signal transmission and reception between STAs may be required. However, peer-to-peer signaling is not supported by the current WLAN specification.

SUMMARY

The present specification proposes a new signal transmission and reception procedure between STAs when a sensing measurement initiated by a non-AP is performed. According to one embodiment of the present disclosure, a sensing measurement procedure is proposed that is performed by an AP by transmitting a sensing initiation frame from the NON-AP to the AP. According to another embodiment of the present disclosure, a procedure is proposed in which the NON-AP transmits a sensing initiation frame to the AP, whereby the AP requests the transmission of NDP frames to the responder STAs. According to another embodiment of the present disclosure, a method for configuring frames transmitted and received in the above procedures is proposed.

According to this specification, a signal transmission and reception procedure without P2P operation when the sensing procedure is initiated by a NON-AP is newly proposed. Therefore, the complexity of the overall sensing procedure such as sensing measurement can be reduced.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed WLAN sensing standard or IEEE 802.11bf standard.

Hereinafter, in order to describe a technical feature of the present specification, a technical feature applicable to the present specification will be described.

A WLAN sensing technology is a sort of radar technologies which can be implemented without a standard, but it is conceived that more powerful performance can be obtained through standardization. The IEEE 802.11bf standard defines an apparatus/device participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
|---|---|
| Sensing Initiator | apparatus/device initiating sensing |
| Sensing Responder | apparatus/device participating in sensing |
| Sensing Transmitter | apparatus/device transmitting sensing PPDU |
| Sensing Receiver | apparatus/device receiving sensing PPDU |

Figure 1:
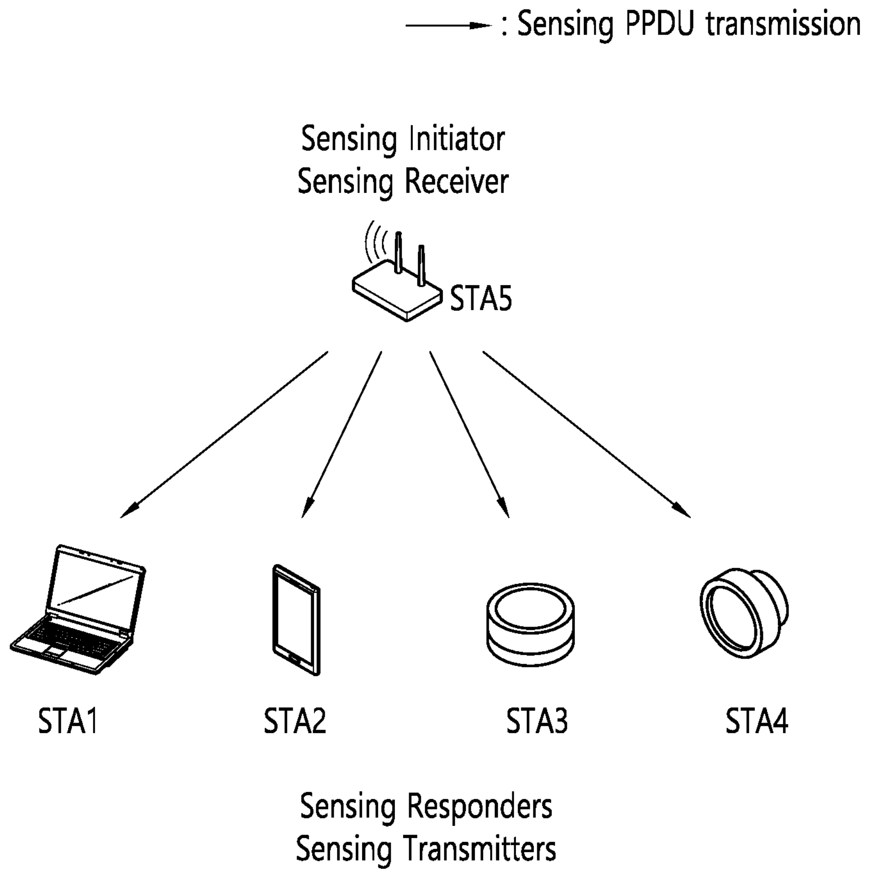
FIG. 1 shows an exemplary WLAN sensing scenario using multiple sensing transmitting devices.

FIG. 1 illustrates an example of a WLAN sensing scenario using multiple sensing transmitting apparatuses/devices.

Figure 2:
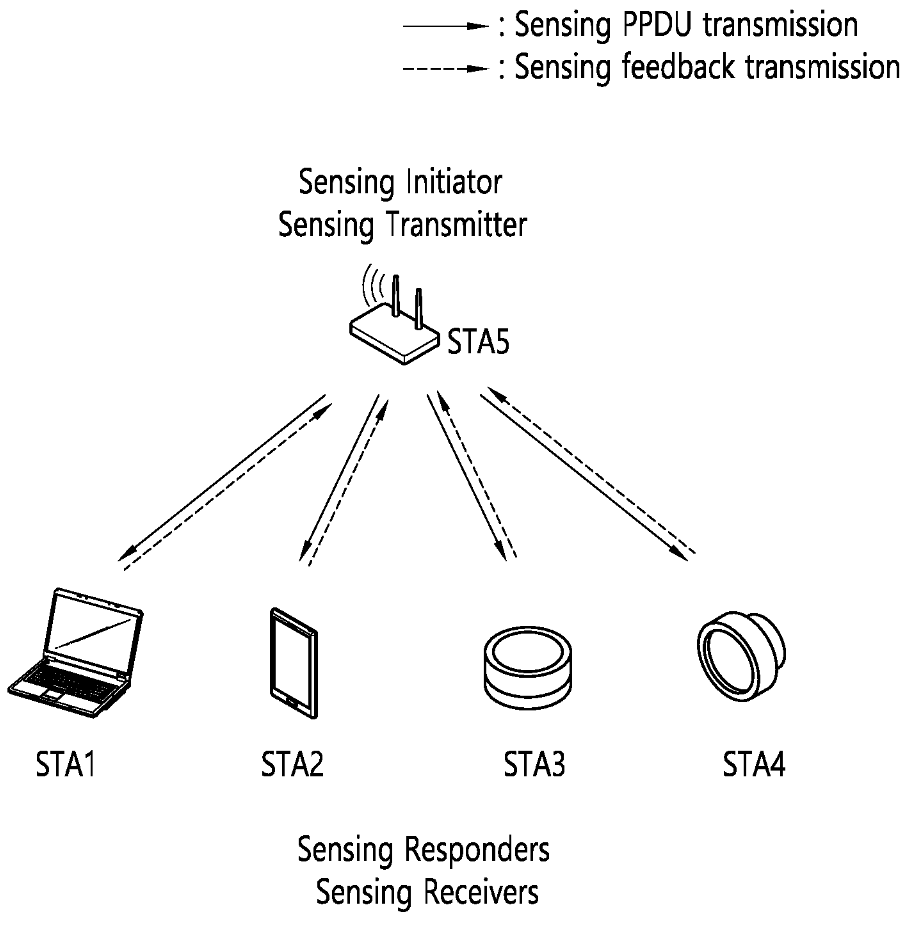
FIG. 2 shows an exemplary WLAN sensing scenario using multiple sensing receiving devices.

FIG. 2 illustrates an example of a WLAN sensing scenario using multiple sensing receiving apparatuses/devices.

FIG. 1 and FIG. 2 illustrate a sensing scenario based on a function and deployment of a WLAN sensing apparatus/device. In an environment assuming one sensing initiation apparatus and multiple sensing participating apparatuses, FIG. 1 is a scenario using multiple sensing PPDU transmitting apparatuses, and FIG. 2 is a scenario using multiple sensing PPDU receiving apparatuses. Assuming that the sensing PPDU receiving apparatus includes a sensing measurement signal processing apparatus, in case of FIG. 2, a procedure for transmitting (feeding back) a sensing measurement result to the sensing initiation apparatus (STA 5) is additionally required.

Figure 3:
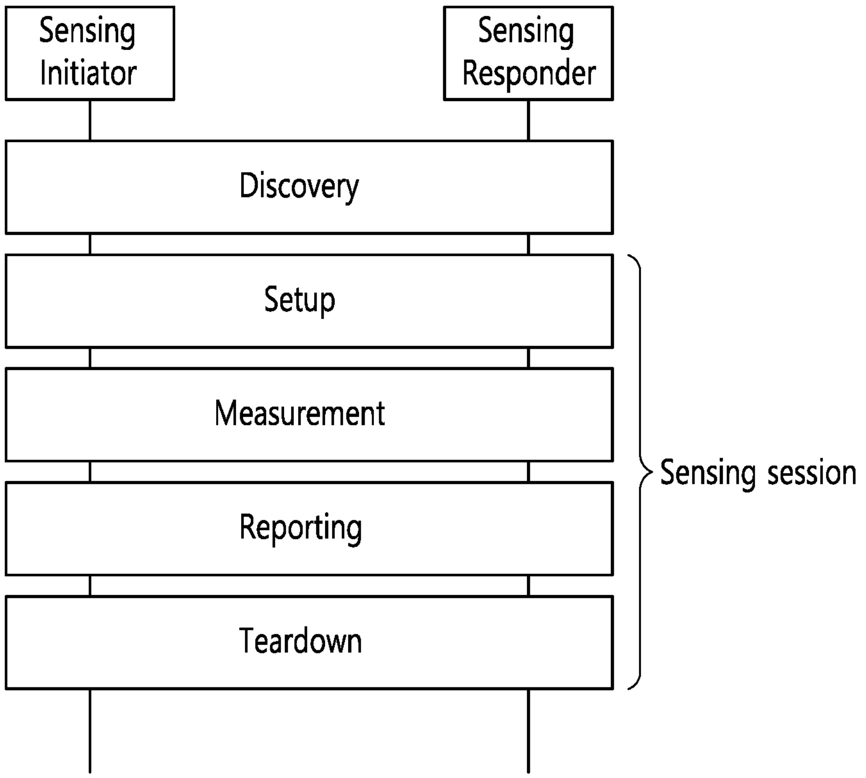
FIG. 3 shows an example of a WLAN sensing procedure.

FIG. 3 illustrates an example of a WLAN sensing procedure.

A procedure of WLAN sensing is performed as discovery, negotiation, measurement exchange, tear down, or the like between WLAN sensing initiation apparatus/device and participating apparatuses/devices. The discovery is a process of identifying sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear down is a process of terminating the sensing procedure.

Figure 4:
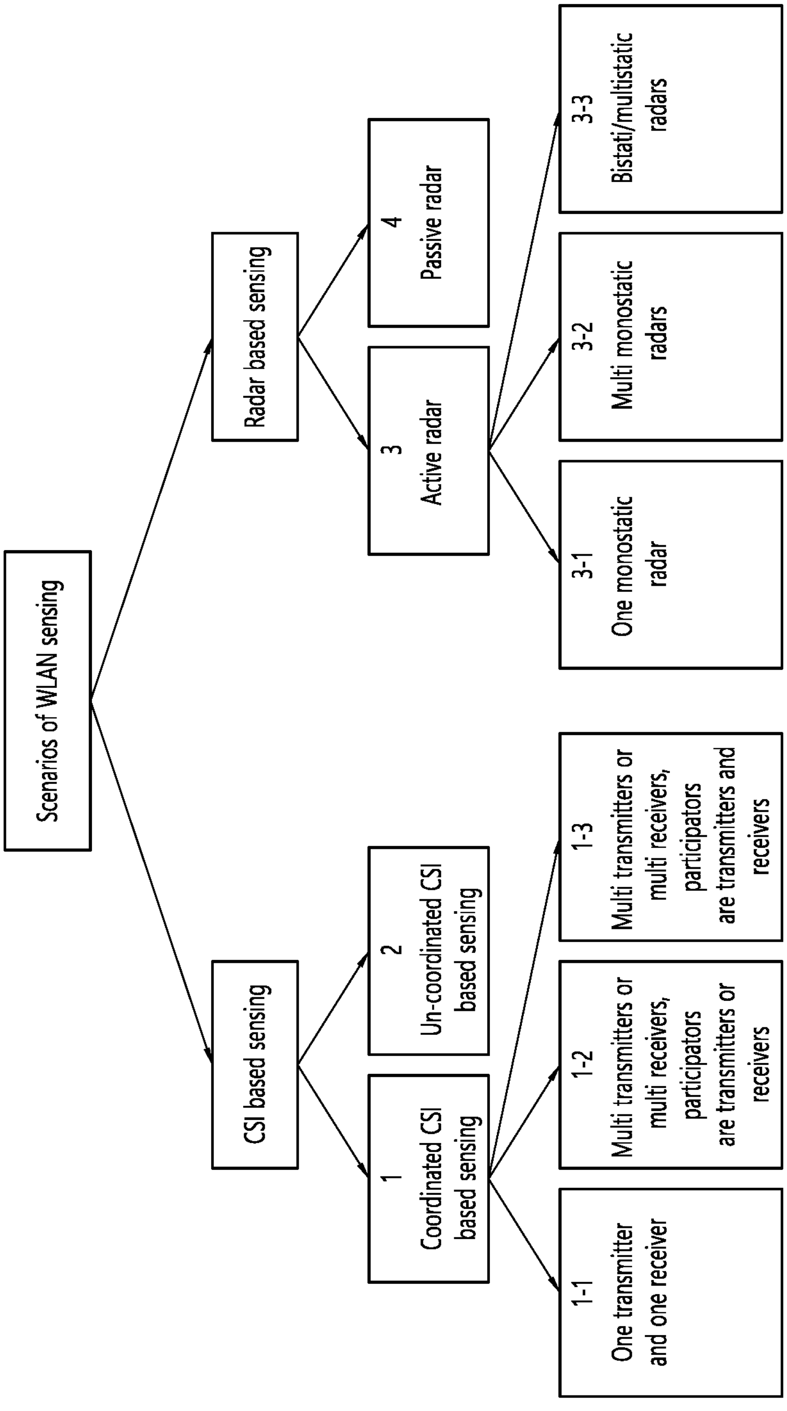
FIG. 4 is an exemplary classification of WLAN sensing.

FIG. 4 is an example of classifying WLAN sensing.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 5:
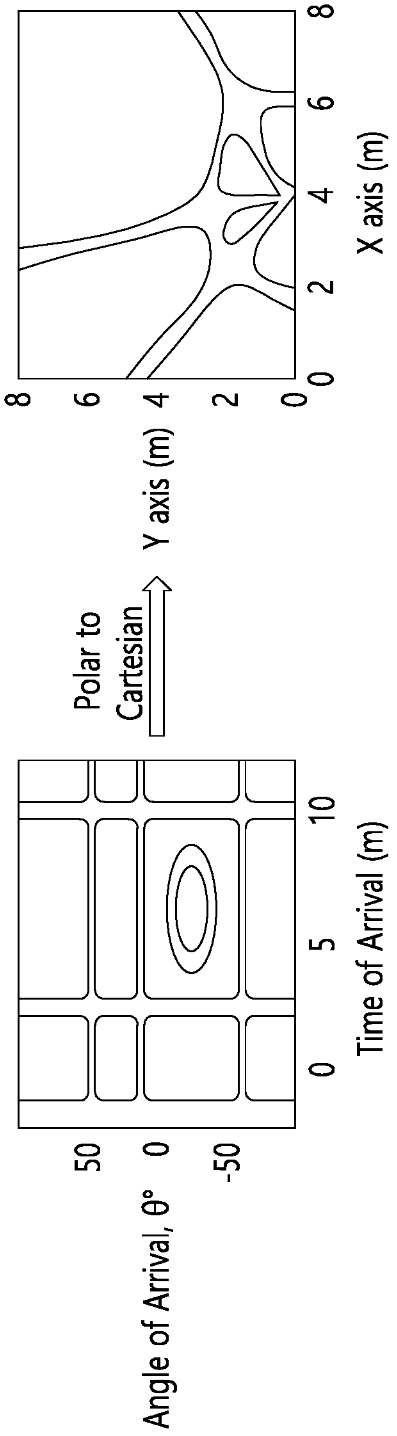
FIG. 5 shows indoor positioning using CSI-based WLAN sensing.

FIG. 5 illustrates indoor positioning which uses CSI-based WLAN sensing.

In FIG. 5, the CSI-based WLAN sensing is utilized in the indoor positioning. An angle of arrival and a time of arrival are obtained by using CSI, and then are converted into an orthogonal coordinate to obtain indoor positioning information.

Figure 6:
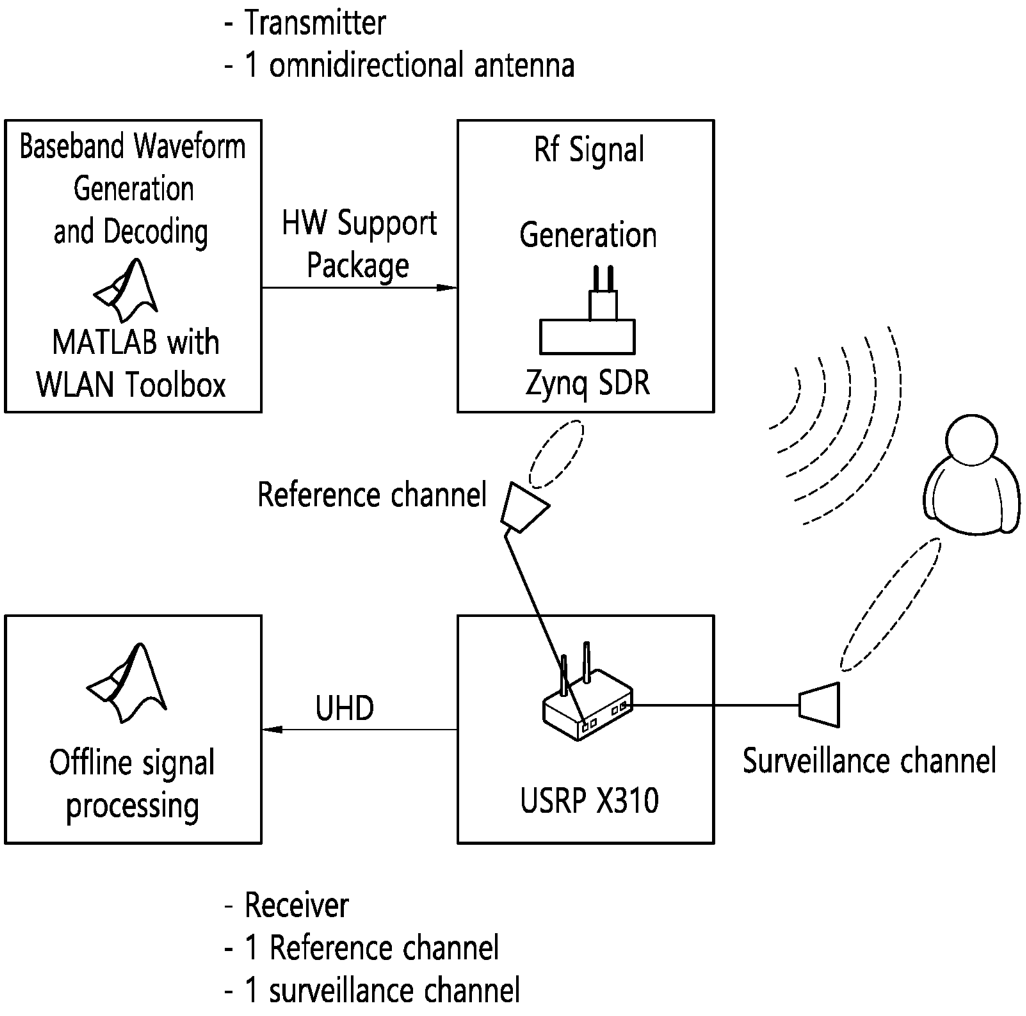
FIG. 6 is an exemplary implementation of a WLAN sensing device.

FIG. 6 is an example of implementing a WLAN sensing apparatus/device.

In FIG. 6, the WLAN sensing apparatus/device is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus/device, it is possible to obtain a unique feature capable of identifying a motion or a body action.

The IEEE 802.11bf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.11bf WLAN sensing is a sort of radar technologies using a WLAN signal which exists anywhere anytime. The following table shows a typical case of using IEEE 802.11bf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Identification of a gesture from a set of gestures - range >0.5 m | 2 | Gesture Detection | | | |
| Gesture recognition - large range (full body movement) | Identification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/Monitoring of elder people and/or children | Tracking person and presence detection | 10 | Detection and localization of person | 0.2-2 | 3/0.1 | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/detection aid | 3 | Fast detection of driver sleepiness | 0.01 | 1/0.1 | 3 |

In IEEE 802.11, a technology that is capable of sensing movement (or motion) or gesture of an object (person or object) by using Wi-fi signals of various bands is being discussed. For example, it is possible to sense the movement (or motion) or gesture of an object (person or object) by using Wi-fi signals (e.g., 802.11ad or 802.11ay signals) of a 60 GHz band. Additionally, it is also possible to sense the movement (or motion) or gesture of an object (person or object) by using Wi-fi signals (e.g., 802.11ac, 802.11ax, 802.11be signals) of a sub-7 GHz band.

Hereinafter, technical characteristics of a PPDU according to the 802.11ay standard, which is one of Wi-fi signals of the 60 GHz band that may be used for WLAN sensing, will be described in detail.

Figure 7:
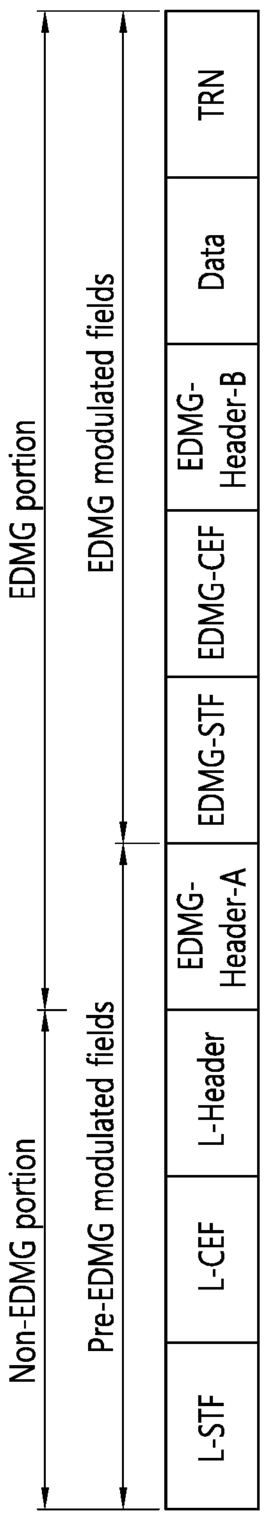
FIG. 7 is a diagram showing a simple PPDU structure that is supported in an 802.11ay WLAN system.

FIG. 7 briefly illustrates a PPDU structure supported in an 802.1 lay WLAN system.

As shown in FIG. 7, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.).

Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields.

The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU.

A structure of EDMG-STF depends on the number of consecutive 2.16 GHz channels through which the EDMG PPDU is transmitted and an index $i_{STS}$ of an $i_{STS}$-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A structure of EDMG-CEF depends on the number of consecutive 2.16 GHz channels through which the EDMG PPDU is transmitted and the number of space-time streams $i_{STS}$. For single space-time stream EDMG PPDU transmission using the EDMG SC mode through one 2.16 GHz channel, an EDMG-CEF field does not exist. For EDMG SC transmission, the EDMG-CEF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Hereinafter, an example of a sensing frame format that is proposed for performing sensing at a 60 GHz band or WLAN sensing will be described in detail. A frame, packet, and/or data unit that is used for performing the sensing proposed in the present specification or the WLAN sensing may also be referred to as a sensing frame. The sensing frame may also be referred to by using other various terms, such as sensing measurement frame, sensing operation frame, and/or measurement frame, and so on.

Figure 8:
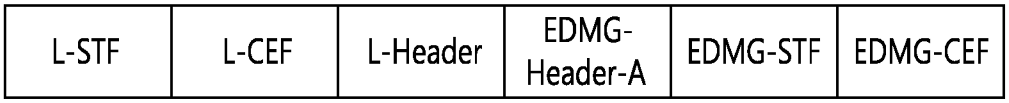
FIG. 8 shows an example of a sensing frame format.

FIG. 8 shows an example of a sensing frame format.

A Wi-Fi Sensing signal may be transmitted/received for channel estimation between an AP/STA and an STA by using a Wi-Fi signal of 60 GHz. At this point, in order to support backward capability with the existing 60 GHz Wi-Fi signal 802.11ad and 802.11 ay, a sensing frame may be configured of a frame format that is shown in FIG. 8, which include a non-EDMG preamble portion (i.e., L-STF, L-CEF, L-Header).

As shown in FIG. 8, a sensing frame may be configured of L-STF, L-CEF, L-Header, EDMG-Header A, EDMG-STF, EDMG-CEF.

That is, since the sensing frame performs sensing on an STA or object by estimating a change in channel between Point to point (P2P) or point to multipoint (P2MP), unlike the conventional EDMG frame, the sensing frame may be configured without including a data field.

Since an EDMG frame may be transmitted by using one or more channels of a 60 GHz band (i.e., various channel bandwidths), as shown in FIG. 8, the sensing frame may be configured to include EDMG-STF and EDMG-CEF fields.

An STA/AP may perform accurate channel information measurement in a sensing transmission/reception bandwidth (BW) by using the EDMG-STF and EDMG-CEF fields.

Information on the BW that is used for the sensing may be transmitted through EDMG-header A. And, at this point, the corresponding information may be transmitted by using various BWs as shown below in the following table.

TABLE 3

| Index | BW |
|---|---|
| 1 | 2.16 GHz |
| 2 | 4.32 GHz |
| 3 | 6.48 GHz |
| 4 | 8.64 GHz |
| 5 | 2.16 + 2.16 GHz (non-contiguous) |
| 6 | 4.32 + 4.32 GHz (non-contiguous) |

Figure 9:
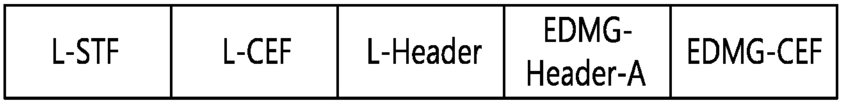
FIG. 9 shows another example of a sensing frame format.

FIG. 9 shows another example of a sensing frame format.

Unlike what is described above, a sensing signal may be transmitted by using only a fixed BW (e.g., 2.16 GHz). And, in this case, since additional AGC, and so on, is/are not needed, the EDMG-STF may be omitted. When performing sensing by using only a predetermined BW, the EDMG-STF may be omitted, thereby configuring a sensing frame format, as shown in FIG. 9. Additionally, since only a predetermined BW is used, when performing sensing, unlike the conventional format, the EDMG-header may not include a BW field.

Figure 10:
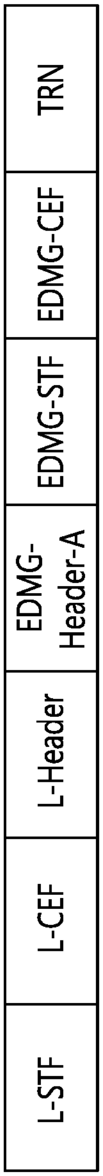
FIG. 10 shows yet another example of a sensing frame format.

FIG. 10 shows yet another example of a sensing frame format.

At 60 GHz, an 802.11ay transmission basically transmits a signal by using beamforming. And, at this point, in order to configure an optimal beam between Tx and Rx, an antenna weight vector (AWV) is configured by using a training (i.e., TRN) field. Therefore, since the sensing frame transmits a signal by using a predetermined AWV, it is difficult for the sensing frame to accurately apply the changed channel situation. Therefore, in order to more accurately measure any change in the channel, the sensing frame may be configured to include the TRN field, as shown below. At this point, the information on the channel may be measured through the TRN field.

In FIG. 10, the sensing frame does not include a data field, and since the sensing frame performs channel measurement for the sensing by using the TRN, the above-described EDMG-CEF field for performing channel estimation may be omitted. Therefore, the sensing frame format may be configured as described below in FIG. 11.

Figure 11:
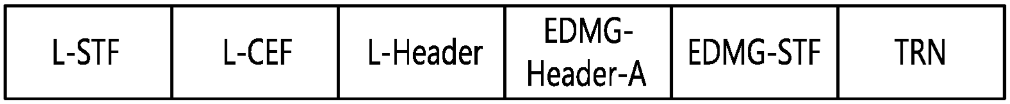
FIG. 11 shows yet another example of a sensing frame format.

FIG. 11 shows yet another example of a sensing frame format.

Hereinafter, the technical characteristics of a PPDU according to a Wi-fi signal of sub-7 GHz that may be used for WLAN sensing will be described in detail.

Hereinafter, an example of a sensing frame format that is proposed for sensing in a sub-7 GHz band or WLAN sensing will be described. For example, for the sensing according to the present specification, various PPDUs of 2.4 GHz, 5 GHz, 6 GHz bands may be used. For example, PPDUs according to the IEEE 802.11ac, 802.11ax, and/or 802.11be standard(s) may be used as the sensing frame.

Figure 12:
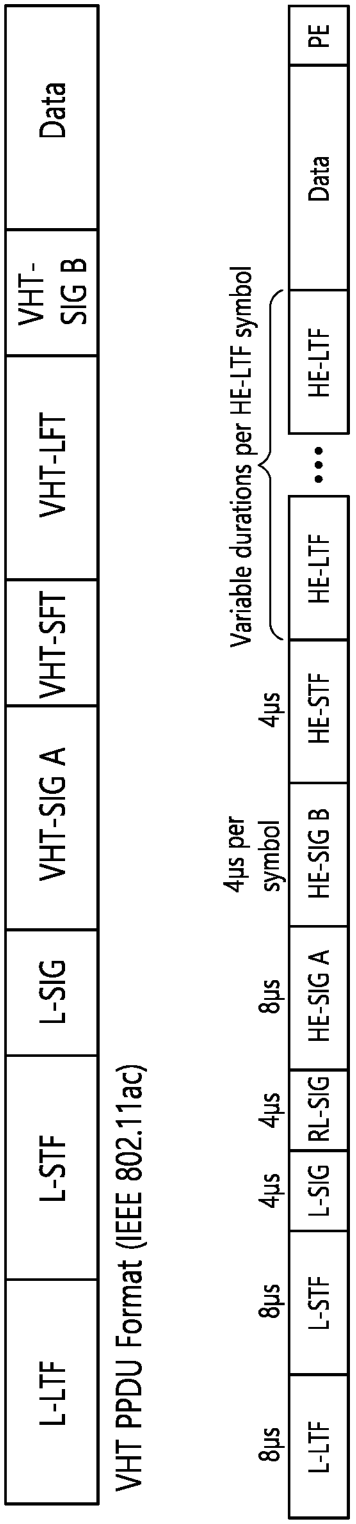
FIG. 12 shows another example of a sensing frame format.

FIG. 12 shows another example of a sensing frame format.

A sensing frame according to the present specification may use only part of the fields shown in FIG. 12. For example, a Data field shown in FIG. 12 may be omitted. Additionally, or alternatively, VHT-SIG B and/or HE-SIG B field(s) shown in FIG. 12 may be omitted.

Figure 13:
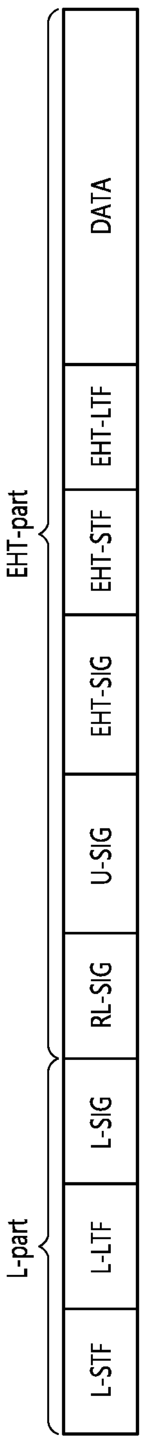
FIG. 13 shows another example of a sensing frame format.

FIG. 13 shows another example of a sensing frame format.

A sensing frame according to the present specification may use only part of the fields of an Extreme High Throughput (EHT) PPDU shown in FIG. 13. For example, a Data field shown in FIG. 13 may be omitted.

The PPDU of FIG. 13 may represent part or all of a PPDU type that is used in an EHT system. For example, the example of FIG. 13 may be used for both single-user (SU) mode and multi-user (MU) mode. In other words, the PPDU of FIG. 13 may be a PPDU for one receiving STA or a PPDU for multiple receiving STAs. When the PPDU of FIG. 13 is used for a Trigger-based (TB) mode, an EHT-SIG of FIG. 13 may be omitted. In other words, an STA that has received a Trigger frame for Uplink-MU (UL-MU) communication may transmit a PPDU, from which the EHT-SIG is omitted in the example of FIG. 13.

Subcarrier spacing of the L-LTF, L-STF, L-SIG, RL-SIG, U-SIG, and EHT-SIG fields of FIG. 13 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 13, L-LTF and L-STF may be the same as the fields of the prior art (or related art).

The L-SIG field of FIG. 13 may, for example, include 24 bits of bit information. For example, the 24-bit information may include a 4-bit Rate field, 1 Reserved bit, a 12-bit Length field, 1 bit of Parity bit, and 6 bits of Tail bits. For example, the 12-bit Length field may include information related to a PPDU length or time duration. For example, a value of the 12-bit Length field may be determined based on a type of the PPDU. For example, when the PPDU is a non-HT PPDU, an HT PPDU, a VHT PPDU, or an EHT PPDU, the value of the Length field may be determined as a multiple of 3. For example, when the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

The transmitting STA may generate an RL-SIG, which is generated identically as the L-SIG. The receiving STA may know that the received PPDU is an HE PPDU or EHT PPDU based on the presence (or existence) of an RL-SIG.

A Universal SIG (U-SIG) may be inserted after the RL-SIG of FIG. 13. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us. Each symbol of the U-SIG may be used for transmitting 26-bit information. For example, each symbol of the U-SIG may be transmitted/received based on 52 data tones and 4 pilot tones.

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 13 may include control information for the receiving STA. For example, the EHT-SIG may include a common field and a user-specific field. The common field may be omitted, and a number of user-specific fields may be determined based on a number of users. The common field may include RU allocation information. The RU allocation information may mean information related to the location of an RU to which multiple users (i.e., multiple receiving STAs) are allocated. The RU allocation information may be configured of 9-bit units. The user-specific field may include information for decoding at least one specified RU (e.g., STA ID information that is allocated to the corresponding RU, MCS index that is applied to the corresponding RU, LDPC/BCC coding type information that is applied to the corresponding RU, and so on) through the common field.

The EHT-STF of FIG. 13 may be used for enhancing automatic gain control estimation in a multiple input multiple output (MIMO) environment or OFDMA environment. And, the EHT-LTF of FIG. 13 may be used for estimating a channel in a MIMO environment or OFDMA environment.

Figure 14:
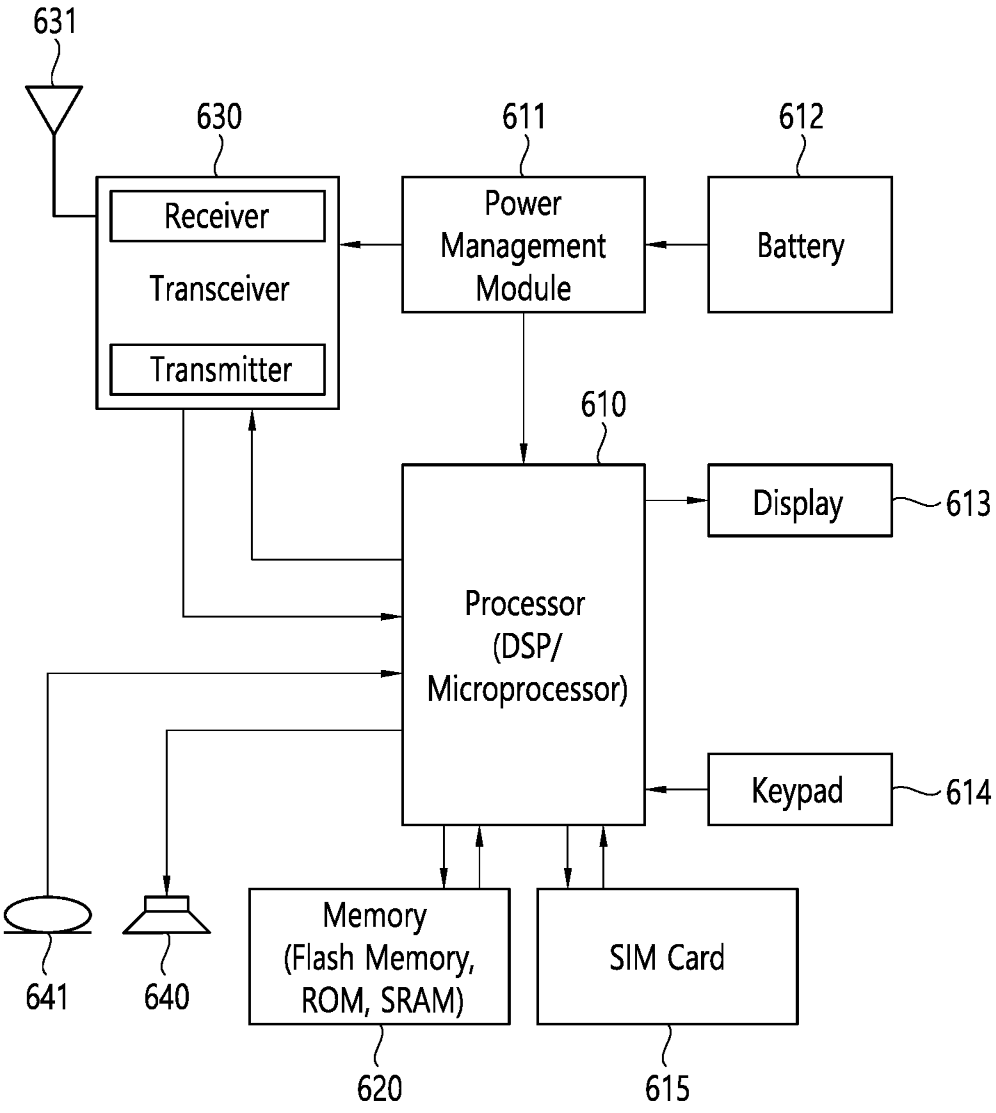
FIG. 14 shows a modified example of a transmitting device and/or receiving device of the present specification.

FIG. 14 shows a modified example of a transmitting device and/or receiving device of the present specification.

The device of FIG. 14 may be referred to by using other various terms, such as mobile terminal, wireless device, Wireless Transmit/Receive Unit (WTRU), User Equipment (UE), Mobile Station (MS), Mobile Subscriber Unit, or, simply, user, and so on. Additionally, the device of FIG. 14 may also be referred to by using other various terms, such as Base Station, Node-B, Access Point (AP), repeater, router, relay, and so on.

A processor 610 of FIG. 14 may instruct (or indicate) and control operations that are performed by the STA, transmitting STA, receiving STA, AP, non-AP, and/or user-STA according to the present specification. For example, the processor 610 may receive a signal from a transceiver 630, process the received signal (Rx signal), generate a transmission signal (Tx signal), and perform a control operation for transmitting the signal. The illustrated processor, memory, and transceiver may be implemented individually as separate chips, or at least two blocks/functions may be implemented through a single chip.

A memory 620 of FIG. 14 may store a signal that is received (i.e., Rx signal) through the transceiver 630 and may store a signal that is to be transmitted (i.e., Tx signal) through the transceiver 630. Additionally, the memory 620 of FIG. 14 may store a signal that is received (i.e., Rx signal) through the transceiver 630 and may store a signal that is to be transmitted (i.e., Tx signal) through the transceiver 630.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs that are to be used by the processor 610. The keypad 614 may be displayed on the display 613. A SIM card 615 may be an integrated circuit that is used to securely store an international mobile subscriber identity (IMSI) and its related key, which are used to identify and authenticate subscribers on mobile telephony devices, such as mobile phones and computers.

Referring to FIG. 14, a speaker 640 may output a result related to a sound processed by the processor 610. And, a microphone 641 may receive an input related to a sound that is to be used by the processor 610.

In the following, the methods proposed herein are described.

To improve the accuracy and resolution of WLAN sensing, WLAN sensing utilizing signal transmission and reception channels between multiple sensing STAs is considered. The sensing STAs may include a station (STA) and an access point (AP). Therefore, in order to efficiently perform WLAN sensing using signal transmission and reception channels between a sensing initiator/initiator and multiple sensing responders, channel estimation for each transmission and reception channel may be required. This specification proposes a channel sounding method for efficiently performing channel measurements for multiple transmit and receive channels used for sensing.

In WLAN sensing, an initiator may measure channels using transmit and receive channels with multiple responders. At this time, the initiator can perform the sensing operation with the following roles.

1. Initiator & transmitter: This can mean that the initiator performs a role of a transmitter that transmits measurement frames for channel estimation to the sensing responder.
2. Initiator & receiver (initiator & receiver): It may refer to the case where the initiator performs a role of receiving the measurement frame by requesting the responder to transmit the measurement frame for channel estimation.

A sensing initiator as defined above may be an AP or a non-AP STA. This specification proposes a sensing measurement procedure when the sensing initiator is a non-AP STA.

Figure 15:
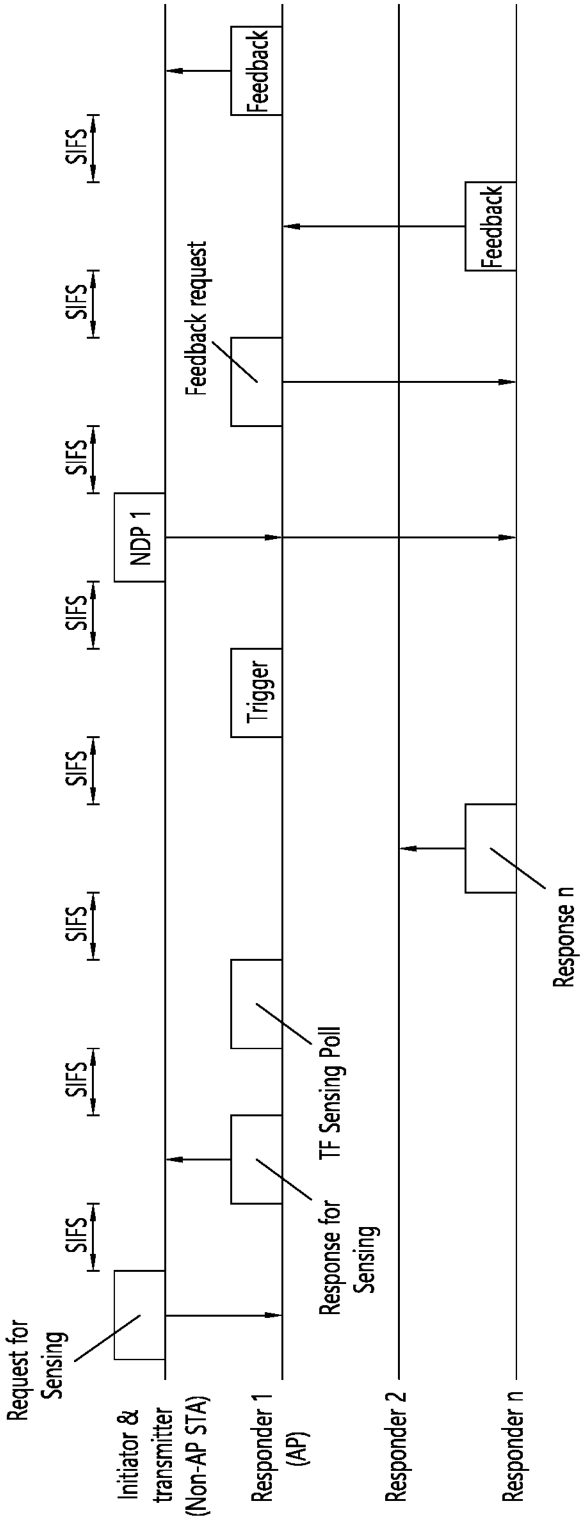
FIG. 15 illustrates an example of a measurement sequence/measurement order where the initiating non-AP STA is acting as a transmitter.

For example, the initiator non-AP STA may have a role of a transmitter. FIG. 15 illustrates an example of a measurement sequence/order when the initiating non-AP STA is acting/operating as a transmitter.

Referring to FIG. 15, the initiator performing a role of a transmitter may transmit a sensing request frame to the responder 1 (AP). Here, the initiator may be a non-AP STA. The responder 1 may transmit a response frame to the sensing request frame to the initiator.

Thereafter, the responder 1 may transmit a sensing poll frame. Here, responder n may transmit a response frame to the sensing poll frame to the responder 1.

Thereafter, the responder 1 may transmit a trigger frame. The initiator may transmit an NDP frame based on the trigger frame. Transmitting the NDP frame may be an operation triggered by the trigger frame.

Subsequently, the responder 1 may transmit a feedback request frame to the responder n. In response to the feedback request frame, the responder n may transmit a feedback frame to the responder 1. The responder 1 may transmit a sensing feedback frame to the initiator.

In another embodiment, the responder 1 may transmit a sensing feedback frame to the initiator after receiving a feedback request frame from the initiator.

When a non-AP STA that is an initiator performs a role of a transmitter, as shown in FIG. 15, some or all of the following rules may apply.

1. A STA/AP participating in sensing may exchange information about their sensing roles and the STA through negotiation of sensing operation.
2. A non-AP STA that is an initiator may transmit a sensing request frame or an initial sensing request frame to an AP participating in sensing to initiate a sensing measurement.

2. A. The request frame transmitted by the non-AP STA may contain some or all of the following information.

2. A. i. Information about the Sensing responder STAs (Sensing responder STAs info)

2. A. i. 1. This information may be STA-ID (identifier) information for the STAs participating in the sensing that has been identified through negotiation or discovery procedures/phases.
2. A. ii. Sensing role indication
2. A. ii. 1. The indication may be information about whether the initiator is performing a role of a transmitter or a receiver.
2. A. ii. 2. the indication may be configured as one bit. In this case, for example, if the initiator is performing a role of a transmitter, the indication may be set to '0', and if the initiator is performing a role of a receiver, the indication may be set to '1'.
2. A. iii. Information about TXOP or sensing duration
2. A. iii. 1. The information may be information about the time for exchanging sensing measurement frames. 2. A. iii. 1.
2. A. iii. 2. Based on the above information, a third-party STA may perform a network allocation vector (NAV) setting. Thus, the sensing operation may be protected.
2. A. iii. 3. The TXOP may be a TXOP requested by the non-AP STA to the AP for sensing or a TXOP determined during sensing negotiation.
2. A. iii. 3. A. If the TXOP is determined during negotiation, the information may be shared among all STAs participating in sensing. In addition, all STAs participating in sensing may use the information for sensing operations.
2. A. iii. 4. The information may be configured as 7 bits.
2. A. iv. Information related to Sensing burst configuration
2. A. iv. 1. The sensing period may include multiple sensing bursts. In this case, the information may include information about the number of the bursts and the size of the bursts.
2. A. v. Sensing operation BW info
2. A. v. 1. The information may be information about a bandwidth over which the sensing measurement is performed. Here, the information may be configured as 3 bits to indicate 20, 40, 80, 160, and/or 320 MHz.
2. B. The AP may transmit a response frame to the non-AP STA in response to the request frame transmitted by the non-AP STA. The response frame may contain the following information.
2. B. i. Sensing bandwidth (Sensing BW)
2. B. ii. TXOP for sensing
2. B. iii. Sensing confirmation
2. C. Through the sensing request frame and response frame exchanged by the non-AP STA and the AP, a third-party STA can set the NAV and not perform channel access while the sensing operation is performed.
3. The AP that transmitted the sensing responder/response frame to the initiator may transmit a sensing poll frame or a sensing trigger frame to the sensing STAs that have the sensing capability identified through the negotiation/sensing request frame to determine whether they can perform sensing.
3. A. The sensing poll frame or sensing trigger frame may include one or more of the following information
3. A. i. STA-ID: An ID for the sensing STA.
3. A. ii. Spatial stream (SS) allocation (sensing allocation): Information about the spatial stream allocated to the STA at the time of sensing.
3. A. iii. BW: Sensing bandwidth
3. A. iv. Sensing measurement indication
3. A. v. Sensing channel confirmation request
3. A. v. 1. The information in the sensing channel confirmation request may indicate whether the sensing bandwidth is available for transmission or reception. The information may be configured in units of 20 MHz. Further, the information may be configured as a bitmap.
3. A. vi. Whether to Request Sensing Feedback
3. A. vi. 1. The information about whether to request sensing feedback may be information indicating whether the transmission of measurement feedback is required.
3. A. vii. Allocation information for a response frame
3. A. vii. 1. The above information may include RU allocation information for the transmission of the response frame.
4. Sensing responder STAs receiving a sensing poll/polling frame from an AP as described above may transmit a response frame to the AP.
4. A. The response frame may be transmitted to the AP sequentially at SIFS intervals. Alternatively, the response frame may be transmitted after the SIFS interval following receipt of the request frame, using bandwidth or resource unit (RU) allocation allocated by the AP.
5. The response frame allows the AP to identify the STAs participating in the actual sensing measurement. After the SIFS interval following the receipt of the response frame, the AP may transmit a trigger frame to perform the sensing measurement.
5. A. The trigger frame transmitted by the AP may be used to request the transmission of a null data packet (NDP) frame from the initiating Non-AP STA.
5. A. i. The trigger frame transmitted by the AP may contain the following information.
5. A. i. 1. ID of the initiator non-AP STA
5. A. i. 2. RU assignment or allocated subchannel info
5. A. i. 3. Information about the number of spatial streams
5. A. i. 4. Number of long training fields (LTFs) or repetitions of LTFs
5. A. i. 5. Size of the LTF
5. A. i. 6. Sensing measurement indication or NDP transmission indication
5. A. i. 6. A. The information may be a request to the initiator to transmit an NDP frame.
5. A. i. 6. B. The information enables the responders to recognize that the transmission of the NDP frame has begun/initiated.
5. B. Additionally, the trigger frame may be used to notify the sensing responders that the transmission of the NDP frame has begun/initiated.
6. Upon receiving the trigger frame from the AP for the transmission of the NDP frame, the initiator may transmit the NDP frame for the sensing measurement. The NDP frame may be transmitted after the SIFS elapses following the receipt of the trigger frame.
7. After the transmission of the NDP frame by the initiator, the AP may transmit a feedback request frame to the responder STAs for channel measurement feedback.
7. A. The feedback request frame may be transmitted after the SIFS elapses following the transmission of the NDP frame.
7. B. The feedback request frame may contain any or all of the following information
7. B. i. Feedback type
7. B. i. 1. The feedback type may include channel quality indicator (CQI), Received Signal Strength Indicator (RSSI), angle, compressed, etc.

7. B. ii. Codebook size

7. B. ii. 1. The information may be information about the size of the information being fed-back.

7. B. iii. Feedback resolution

7. B. iii. 1. The information may include information about the channel measurement unit (e.g., ng=1, 2, 4, 8, 16, etc.).

7. B. iv. RU assignment

7. B. iv. 1. The information may include information about the RU used when performing feedback of measurement information.

7. B. v. Spatial stream (SS)

7. B. v. 1. The information may include information about the number of allocated SSs and the starting point of the allocated SSs.

7. B. vi. Modulation and coding scheme (MCS)

7. B. vi. 1. The information may include the MCS information used for feedback information.

7. B. vii. Encoding

7. B. vii. 1. The information may indicate the encoding information (BCC or LDPC) for the feedback information.

8. An AP that receives feedback information from respondent STAs after transmitting the feedback request frame may transmit channel measurement information received from other responders to the initiator.

8. A. The responder STAs may simultaneously transmit the feedback information using the allocated RU after the SIFS elapses following the receipt of the feedback request frame.

8. B. In contrast to the above, the responders may sequentially transmit feedback information to the AP at SIFS intervals.

8. C. Here, after the SIFS elapses following the receipt of feedback information from all responder STAs participating in the sensing, the AP may transmit all feedback information to the initiator.

8. D Unlike the above, the AP may transmit all feedback information to the initiator after receiving a feedback request frame from the initiator.

9. The above assumes that the procedure for sensing measurements is performed at one TXOP, but the measurements may be performed at multiple TXOPs.

9. A. In one example, the TXOP for sensing feedback may be set up separately.

9. B. As another example, a TXOP for each of the sensing request & response, sensing polling and NDP transmission, and feedback procedures may be established independently.

Figure 16:
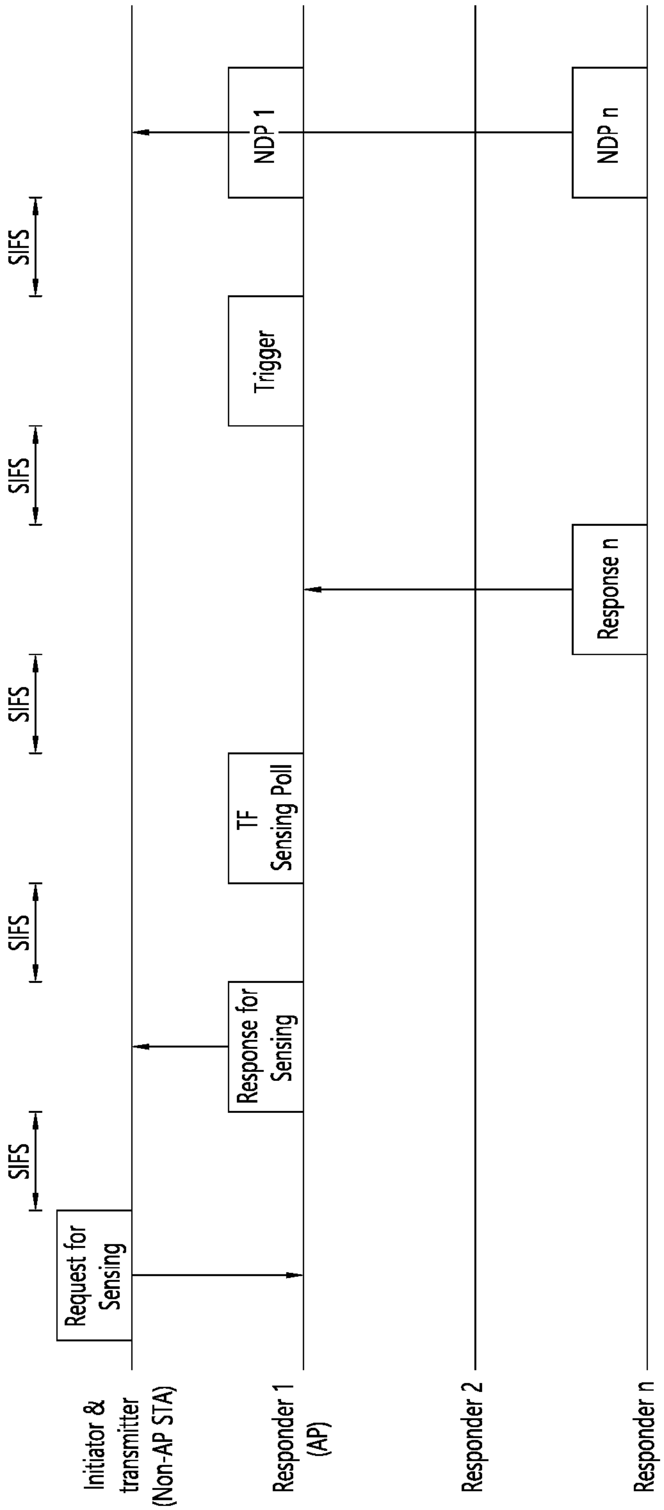
FIG. 16 illustrates an example of a measurement sequence/order of measurements when the non-AP STA that is the initiator is acting as a receiver.

In contrast to the above, the initiator non-AP STA may have a role of a receiver. FIG. 16 illustrates an example of a measurement sequence when an initiator non-AP STA performs a role of a receiver.

When the non-AP STA that is the initiator performs a role of the receiver, some or all of the following rules may apply:

10. The same sensing procedure as described in Rules 1 through 4 above may be applied. For example, referring to FIG. 16, an initiator that is a non-AP STA may transmit a sensing request frame to responder_1 that is an AP. The AP receiving the request frame may then transmit a response frame to the initiator after the SIFS has elapsed.

10. A. The request frame and the response frame may contain the information proposed in Rules 1 and 2 above.

11. The AP may transmit a sensing poll/polling frame after transmitting the response frame. Each frame may be configured as described in Rules 3 and 4 above. Further, frame exchanges between the AP and the responder STAs may be performed.

12. The AP that has identified the actual sensing responder participating in the sensing through the response frame received from the responder STAs as shown in FIG. 16 may transmit a trigger frame to the responder STAs to request the transmission of the NDP frame to the responder STAs.

12. A. The trigger frame to request the transmission of the NDP frame may include the following information.

12. A. i. NDP transmission request indication

12. A. ii. Responder STA's ID information

12. A. ii. 1. The information may include identity information for the STAs transmitting the NDP frame.

12. A. iii. LTF information

12. A. iii. 1. The information may indicate the LTF size or type (e.g., 1×, 2×, 4×).

12. A. iii. 2. The information may include information about the repetition of the LTF.

12. A. iii. 3. The information may include information about the number of symbols in the LTF.

12. A. iv. Number of Spatial Streams (Nss)

12. A. iv. 1. The above information may provide the number of Nss allocated per STA.

12. A. iv. 2. The above information can provide the total Nss.

12. A. v. RU/subchannel allocation for bandwidth or NDP frames

12. A. v. 1. The information may include information about the bandwidth and RU/subchannel for the transmission of the NDP frame.

13. After the SIFS elaps following the receipt of the trigger frame requesting the transmission of the NDP frame, the responder STA may transmit the NDP frame to the initiator.

13. A. Here, the AP may also transmit an NDP frame to the initiator.

13. B. The NDP frames may be transmitted simultaneously. Alternatively, the NDP frames may be transmitted sequentially by the responder STAs at SIFS intervals.

Figure 17:
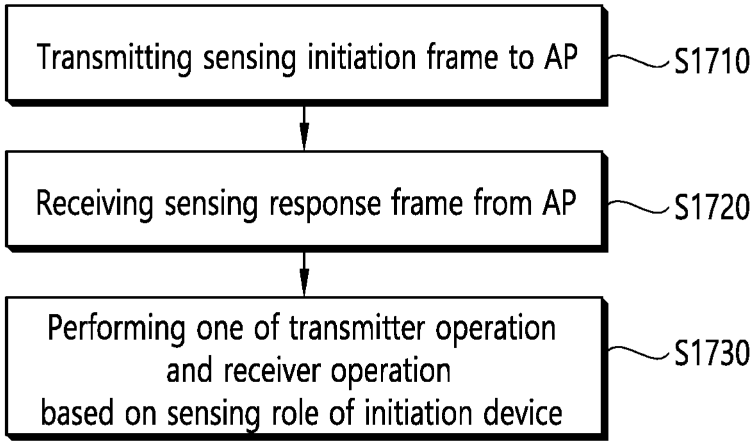
FIG. 17 is a flowchart of an example of a method performed by an initiation device in a wireless LAN system.

Examples of sensing procedures performed in a wireless LAN system according to some implementations of the present disclosure are described below. FIG. 17 is a flowchart of an example of a method performed by an initiation device (the initiator) in a wireless LAN system.

Referring to FIG. 17, an initiation device transmits a sensing initiation frame to an AP (S1710). Here, the initiation device may be a non-AP station. Further, the sensing initiation frame may be the same as the sensing request frame of FIGS. 15 and/or 16. In response to the sensing initiation frame, the initiation device receives a sensing response frame from the AP (S1720).

Thereafter, the initiation device performs one of a transmitter operation and a receiver operation based on the sensing role of the initiation device (S1730). When the initiation device performs a role of a transmitter, the procedures described based on FIG. 15 may be performed. Specifically, based on the initiation device performing the role of a transmitter, the initiation device may transmit a first NDP frame. Wherein, the first NDP frame may be a frame transmitted by the initiation device based on a trigger frame received by the initiation device from the AP.

Furthermore, if the initiation device performs a role of a receiver, the procedures described with reference to FIG. 16 may be performed. For example, based on the initiation device performing a role of a receiver, the initiation device may receive the second NDP frame from the at least one response device.

Figure 18:
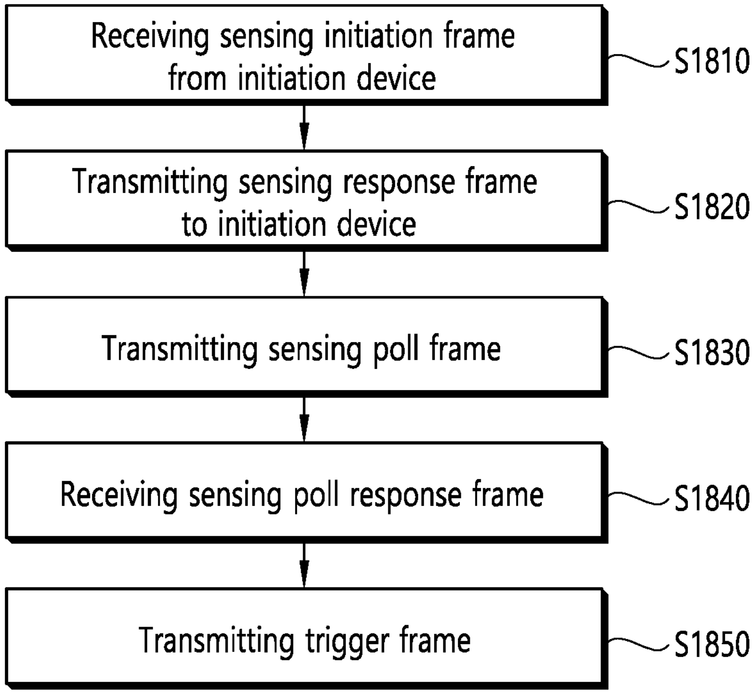
FIG. 18 is a flowchart of an example of a method performed by an AP in a wireless LAN system.

FIG. 18 is a flowchart of an example of a method performed by an AP in a wireless LAN system.

Referring to FIG. 18, the AP receives a sensing initiation frame from an initiation device (S1810). Here, the initiation device may be a non-AP STA. In response to the initiation frame, the AP transmits a sensing response frame to the initiation device (S1820).

The AP transmits a sensing poll frame (S1830). The AP receives a sensing poll response frame from at least one response device in response to the sensing poll frame (S1840).

The AP transmits a trigger frame to the initiation device and one of the at least one response device, based on the role of the initiation device (S1850). The role of the initiation device may be the transmitter or receiver.

An example of when the role of the initiation device is a transmitter may be as shown in the example of FIG. 15. Specifically, based on the initiation device fulfilling the role of a transmitter, the AP may transmit the trigger frame to the initiation device. Here, the trigger frame may be a frame that triggers the transmission of an NDP frame by the initiation device. Further, the AP may transmit a feedback request frame to the at least one response device. Further, the AP may receive a feedback response frame from the at least one response device in response to the feedback request frame. Wherein, the feedback response frame may include sensing measurement information for a sensing measurement performed by the at least one response device. Further, the AP may transmit a feedback frame comprising the sensing measurement information to the initiation device based on the feedback response frame.

Alternatively, an example of when the initiation device is a receiver may be as in the example of FIG. 16. Specifically, based on the initiation device fulfilling the role of receiver, the AP may transmit the trigger frame to the at least one response device. Wherein, the trigger frame may be a frame that triggers the transmission of an NDP frame by the at least one response device. In this case, the NDP frame may be a frame transmitted to the initiation device. The initiation device may perform a sensing measurement based on the NDP frame.

It is evident that the configured/suggested methods which are described with reference to FIGS. 15 and 16 may be applied to FIGS. 17 and/or 18. Accordingly, redundant descriptions are omitted.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to ahead-mount display (HMD), ahead-up display (HUD), a mobile phone, a tablet PC, a laptop computer, a desktop computer, a TV, digital signage, and the like. A device to which XR technology is applied may be referred to as an XR device.

What is claimed is:

1. A method performed in a wireless local area network (WLAN) system, the method comprising:

transmitting, by a non-AP station (STA), a sensing initiation frame to an access point (AP), wherein the sensing initiation frame allows the non-AP STA to invoke a procedure to request the AP to perform a sensing procedure, wherein the sensing initiation frame is related to at least one sensing responder for which the AP is requested to include in the sensing procedure, wherein the sensing initiation frame includes address information related to the at least one sensing responder and role information of the at least one sensing responder, wherein the role information has a first value for a sensing receiver role and has a second value for a sensing transmitter role, wherein the first value for the sensing receiver role is set to one (1);

receiving, by the non-AP STA, a sensing response frame from the AP in response to the sensing initiation frame; and receiving, by the non-AP STA, a sensing feedback frame from the AP, wherein the sensing feedback frame includes information related to a result of a sensing measurement received by the AP.

2. The method of claim 1, wherein the sensing measurement is received based on a trigger frame transmitted by the AP and at least one trigger-based physical layer protocol data unit (PPDU) received by the AP.

3. A non-AP station (STA) in a wireless local area network (WLAN) system, comprising:

a transceiver adapted to transmit and/or receive a wireless signal; and a processor adapted to control the transceiver, wherein the processor is further adapted to:

transmit a sensing initiation frame to an access point (AP), wherein the sensing initiation frame allows the non-AP STA to invoke a procedure to request the AP to perform a sensing procedure, wherein the sensing initiation frame is related to at least one sensing responder for which the AP is requested to include in the sensing procedure, wherein the sensing initiation frame includes address information related to the at least one sensing responder and role information of the at least one sensing responder, wherein the role information has a first value for a sensing receiver role and has a second value for a sensing transmitter role, wherein the first value for the sensing receiver role is set to one (1);

receive a sensing response frame from the AP in response to the sensing initiation frame; and receive a sensing feedback frame from the AP, wherein the sensing feedback frame includes information related to a result of a sensing measurement received by the AP.

4. The non-AP STA of claim 3, wherein the sensing measurement is received based on a trigger frame transmitted by the AP and at least one trigger-based physical layer protocol data unit (PPDU) received by the AP.

5. An access point (AP) in a wireless local area network (WLAN) system, comprising:

a transceiver adapted to transmit and/or receive a wireless signal; and a processor adapted to control the transceiver, wherein the processor is further adapted to:

receive a sensing initiation frame from a non-AP station (STA), wherein the sensing initiation frame allows the non-AP STA to invoke a procedure to request the AP to perform a sensing procedure, wherein the sensing initiation frame is related to at least one sensing responder for which the AP is requested to include in the sensing procedure, wherein the sensing initiation frame includes address information related to the at least one sensing responder and role information of the at least one sensing responder, wherein the role information has a first value for a sensing receiver role and has a second value for a sensing transmitter role, wherein the first value for the sensing receiver role is set to one (1);

transmit a sensing response frame to the non-AP STA in response to the sensing initiation frame; and transmit a sensing feedback frame to the non-AP STA, wherein the sensing feedback frame includes information related to a result of a sensing measurement received by the AP.

6. The AP of claim 5, wherein the sensing measurement is received based on a trigger frame transmitted by the AP and at least one trigger-based physical layer protocol data unit (PPDU) received by the AP.

* * * * *